United States Patent
Asano et al.

(10) Patent No.: US 9,891,075 B2
(45) Date of Patent: Feb. 13, 2018

(54) MAGNETIC ENCODER

(71) Applicant: Mitsubishi Electric Corporation, Chiyoda-ku, Tokyo (JP)

(72) Inventors: Takumi Asano, Tokyo (JP); Taizo Iwami, Tokyo (JP); Takashi Tamura, Tokyo (JP); Takeshi Musha, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 225 days.

(21) Appl. No.: 14/771,637

(22) PCT Filed: Feb. 6, 2014

(86) PCT No.: PCT/JP2014/052751
§ 371 (c)(1),
(2) Date: Aug. 31, 2015

(87) PCT Pub. No.: WO2014/174870
PCT Pub. Date: Oct. 30, 2014

(65) Prior Publication Data
US 2016/0025516 A1    Jan. 28, 2016

(30) Foreign Application Priority Data
Apr. 24, 2013  (WO) .................. PCT/JP2013/062094

(51) Int. Cl.
*G01R 33/09* (2006.01)
*G01D 5/16* (2006.01)
(Continued)

(52) U.S. Cl.
CPC .............. *G01D 5/16* (2013.01); *G01D 5/245* (2013.01); *G01D 5/24442* (2013.01); *G01P 3/443* (2013.01); *G01P 3/487* (2013.01)

(58) Field of Classification Search
CPC ...... G01D 5/16; G01D 5/245; G01D 5/24442; G01P 3/443; G01P 3/487
(Continued)

(56) References Cited

U.S. PATENT DOCUMENTS 8,176,799 B2    5/2012  Kubokawa et al.
2007/0152657 A1  7/2007  Yabe et al.
(Continued)

FOREIGN PATENT DOCUMENTS

JP    6-331384 A    12/1994
JP    10-19603 A    1/1998
(Continued)

OTHER PUBLICATIONS

Communication dated Feb. 2, 2016 from the Japanese Patent Office in counterpart application No. 2015-513582.
(Continued)

*Primary Examiner* — Melissa Koval
*Assistant Examiner* — Courtney McDonnough
(74) *Attorney, Agent, or Firm* — Sughrue Mion, PLLC; Richard C. Turner (57) ABSTRACT

To provide a magnetic encoder in which a base material has a ring-shaped body portion into which a rotation axis is inserted when a magnetic drum is mounted on a rotation axis, and an engagement convex portion provided so as to project over a whole circumference of an outer periphery of the body portion. The body portion has a centering track provided in a part of the outer periphery of the body portion over the whole circumference as a reference of circular runout tolerance on an outer periphery of a magnet. The engagement convex portion has a constricted portion projecting from the outer periphery of the body portion, and a cylindrical portion extending in an axial direction of the body portion from a tip end of the constricted portion. The
(Continued)

magnet surrounds the engagement convex portion so as to wrap around to a gap between the cylindrical portion and the body portion, and exposes the centering track without covering the centering track.

14 Claims, 11 Drawing Sheets

(51) Int. Cl.
*G01P 3/44* (2006.01)
*G01P 3/487* (2006.01)
*G01D 5/244* (2006.01)
*G01D 5/245* (2006.01)

(58) Field of Classification Search
USPC .................................................. 324/207.21
See application file for complete search history.

(56) References Cited

U.S. PATENT DOCUMENTS

| | | |
|---|---|---|
| 2009/0219017 A1 | 9/2009 | Mizuta |
| 2009/0256551 A1 | 10/2009 | Ito et al. |
| 2010/0162831 A1 | 7/2010 | Kubokawa et al. |

FOREIGN PATENT DOCUMENTS

| | | |
|---|---|---|
| JP | 10-293043 A | 11/1998 |
| JP | 2005-233923 A | 9/2005 |
| JP | 2007-101405 A | 4/2007 |
| JP | 2007-187484 A | 7/2007 |
| JP | 2008-224697 A | 9/2008 |
| JP | 2009-133812 A | 6/2009 |
| JP | 2013-195262 A | 9/2013 |

OTHER PUBLICATIONS

Communication dated Sep. 27, 2016, from the State Intellectual Property Office of People's Republic of China in counterpart Application No. 201480022995.X.
International Search Report for PCT/JP2014/052751 dated Apr. 28, 2014 [PCT/ISA/210].
Written Opinion for PCT/JP2014/052751 dated Apr. 28, 2014 [PCT/ISA/237].
Communication dated Oct. 7, 2015 from the Taiwanese Intellectual Property Office in counterpart application No. 103113984.
Communication dated Apr. 24, 2017 issued by the State Intellectual Property Office of People's Republic of China in counterpart application No. 201480022995.X.
Communication dated May 23, 2017, issued by the Korean Intellectual Property Office in corresponding Korean Application No. 10-2015-7032154.
Communication dated Aug. 9, 2017, from the State Intellectual Property Office of People's Republic of China in counterpart Application No. 201480022995.X.

MAGNETIC ENCODER

CROSS REFERENCE TO RELATED APPLICATIONS

This application is a National Stage of International Application No. PCT/JP2014/052751, filed on Feb. 6, 2014, which claims priority from International Application No. PCT/JP2013/062094, filed on Apr. 24, 2013, the contents of all of which are incorporated herein by reference in their entirety.

FIELD

The present invention relates to a magnetic encoder.

BACKGROUND

As one of devices used for detecting a rotation angle of a machine shaft, a magnetic encoder has been known. The magnetic encoder includes a magnetic drum having a ring-shaped magnetic material (a magnet) in which a magnetic pole array is magnetized on the outer circumference, and a magnetic resistance element (MR element) closely arranged on the outer circumference of the magnetic drum. The magnetic drum is mounted on the shaft of the machine to be detected and rotates together with the shaft, and by detecting a change of a magnetic field associated with the rotation of the magnetic drum by the MR element, a rotation angle of the shaft to be detected is detected.

The magnetic drum is configured by a base material made of a magnetic body and a ring-shaped magnet fixed to the outer circumference of the base material. A centrifugal force is acting all the time on the rotating magnetic drum, and the centrifugal force acts as a force that takes the magnet off from the outer periphery of the base material. The centrifugal force of the magnetic drum rotating at a high speed can be a factor causing a breakage of the magnet. Therefore, the magnet and the base material need to be fixed to each other firmly in order to ensure the reliability of the magnetic encoder.

For fixation of the base material and the magnet, an adhesive is used. However, because an application work of the adhesive is performed manually, variability is likely to occur in the process. In a portion where insufficient filling of the adhesive or entrainment of bubbles has occurred, bonding (fixation) strength decreases, thereby the portion can be a factor causing breakage of the magnet.

Furthermore, uneven thickness of the adhesive becomes a factor of generating vibration during rotation of the magnetic drum.

When the drum is to be produced stably and manually while preventing these problems, an increase in production costs is unavoidable.

Patent Literature 1 discloses a technique in which a groove is provided at an outer peripheral end edge of a disk-shaped wheel as a base material, and an annular magnet is injection molded in the groove.

CITATION LIST

Patent Literature

Patent Literature 1: Japanese Patent Application Laid-open No. H6-331384

SUMMARY

Technical Problem

However, according to Patent Literature 1 listed above, complicated machining needs to be applied to the outer peripheral end edge of the wheel being the base material, thereby causing an increase in manufacturing costs of a magnetic drum.

The present invention has been achieved in view of the above problems, and an object of the present invention is to provide a magnetic encoder that can prevent a partial decrease in bonding strength between a magnet and a base material and imbalance of center of gravity, and can reduce manufacturing costs.

Solution to Problem

To solve the above described problems and achieve the object a magnetic encoder according to the present invention includes: a magnetic drum having an annular magnet formed with a magnetic pole array on an outer circumference thereof and a base material that supports the magnet, and mounted on a rotation axis of a machine to be detected to rotate together with the rotation axis; and an MR element that is installed in the machine to be detected in a state of facing an outer periphery of the magnetic drum with a gap, to detect a change of a magnetic field caused by rotation of the magnetic drum. The magnetic encoder detects an angle of the rotation axis based on a detection result of the MR element, the base material has a ring-shaped flange portion into which the rotation axis is inserted when the magnetic drum is mounted on the rotation axis, and an engagement convex portion provided so as to project over a whole circumference of an outer periphery of the flange portion. The flange portion has a reference plane provided in a part of the outer periphery of the flange portion over a whole circumference as a reference of circular runout tolerance on an outer periphery of the magnet. The engagement convex portion has a constricted portion projecting from the outer periphery of the flange portion, and a cylindrical portion extending in an axial direction of the flange portion from a tip end of the constricted portion. The magnet surrounds the engagement convex portion so as to wrap around to a gap between the cylindrical portion and the flange portion, and exposes the reference plane without covering the reference plane.

Advantageous Effects of Invention

The magnetic encoder according to the present invention can prevent a partial decrease of the bonding strength and imbalance of center of gravity to prevent a magnet from being broken at the time of high-speed rotation, and can further reduce manufacturing costs by automatically performing integral molding by an injection molding machine.

DESCRIPTION OF EMBODIMENTS

Exemplary embodiments of a magnetic encoder according to the present invention will be explained below in detail with reference to the accompanying drawings. The present invention is not limited to the embodiments.

First Embodiment

Figure 1A:
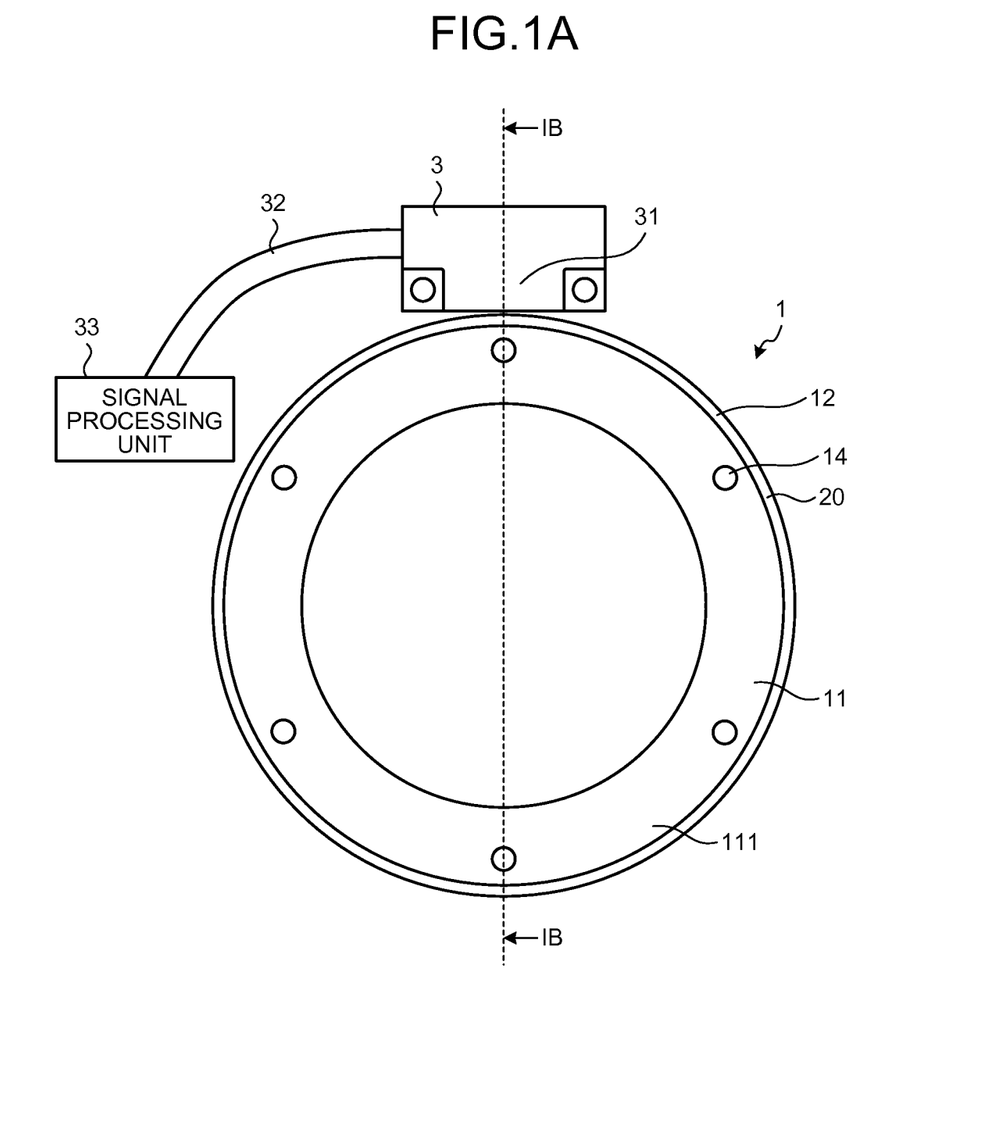
FIG. 1A is a diagram schematically illustrating a configuration of a magnetic encoder according to a first embodiment of the present invention.
Figure 1B:
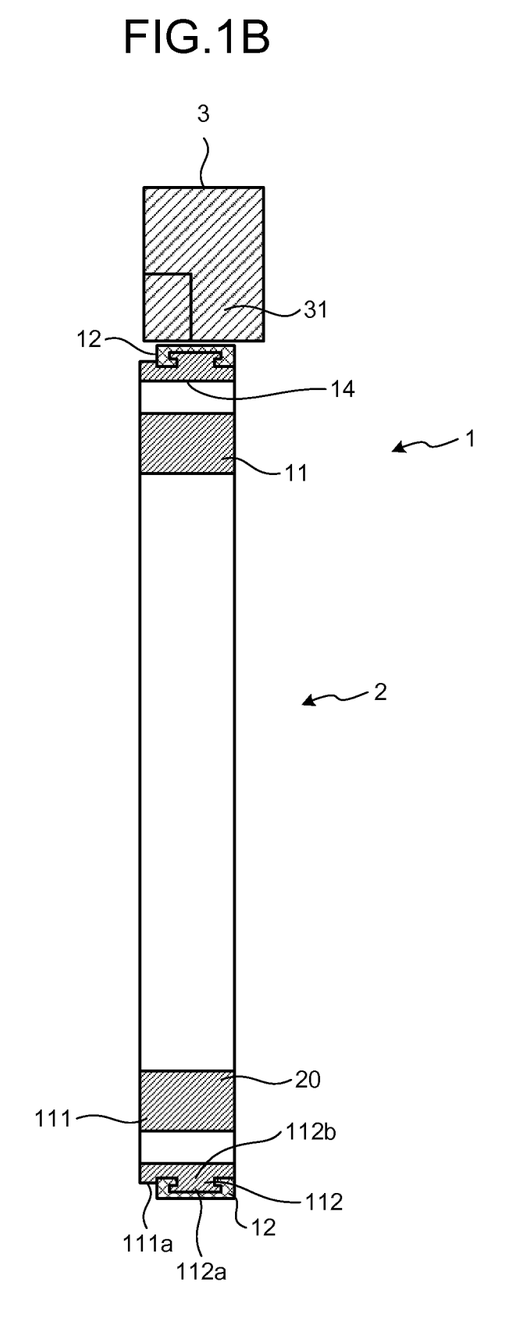
FIG. 1B is a diagram schematically illustrating a configuration of the magnetic encoder according to the first embodiment of the present invention.

FIG. 1A and FIG. 1B are diagrams schematically illustrating a configuration of a magnetic encoder according to a first embodiment of the present invention. FIG. 1B is a sectional view along a line IB-IB in FIG. 1A. A magnetic drum 20 is configured by a base material 11 and a magnet 12. A magnetic encoder 1 includes a magnetic drum 2 and a sensor head 3. The magnetic drum 20 includes attachment holes 14 for attachment to a shaft. The sensor head 3 includes an MR element 31, and is installed in proximity to the outer circumference of the magnetic drum 2. An output of the MR element 31 is transmitted to a signal processing unit 33 via a cable 32. The signal processing unit 33 detects an angle of the shaft attached with the magnetic drum 20 based on a change of a magnetic field associated with rotation of the magnetic drum 20.

Figure 2:
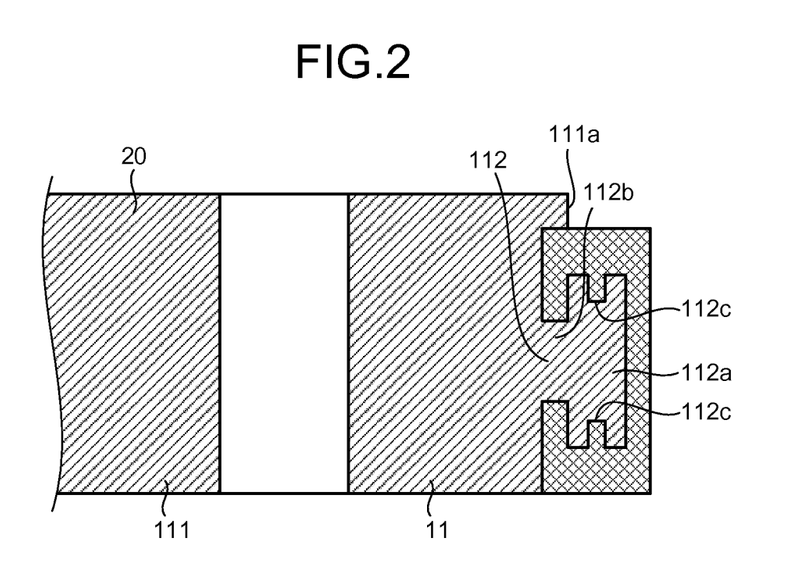
FIG. 2 is a diagram schematically illustrating a configuration of a magnetic encoder provided with a groove at a tip end of a cylindrical portion.

The base material 11 is formed of a ferrous material having magnetic properties, and includes a ring-shaped body portion 111 and an engagement convex portion 112 provided on the outer circumference of the body portion 111. The engagement convex portion 112 includes a cylindrical portion 112a and a constricted portion 112b. The engagement convex portion 112 extends in the axial direction and is axially symmetric, with the cylindrical portion 112a being configured by planes at right angles to each other, and is constricted and narrowed at the constricted portion 112b. A shape representing a substantially T-shape as viewed in cross section is referred to as "T-shape". The attachment holes 14 for attachment to a shaft of a machine to be detected are formed in the body portion 111. The magnet 12 surrounds the engagement convex portion 112 so as to wrap around to the inside of the cylindrical portion 112a, and the base material 11 (the engagement convex portion 112) is fitted into a concave portion of the magnet 12 as viewed in cross section. Accordingly, in the first embodiment, the cylindrical portion 112a forms a cylinder portion, and the body portion 111 forms a flange portion. A groove 112c or the like may be formed at an axial tip end of the cylindrical portion 112a to strengthen fixation of the magnet 12. FIG. 2 is a diagram schematically illustrating a configuration of a magnetic encoder provided with a groove at a tip end of a cylindrical portion. A part of the outer periphery of the body portion 111 is exposed without being covered with the magnet 12, and is designated as a centering track 111a as a reference plane, being a reference of circular runout tolerance on the outer periphery of the magnet 12. The centering track 111a is provided in a ring shape over the whole circumference of the body portion 111.

Figure 3:
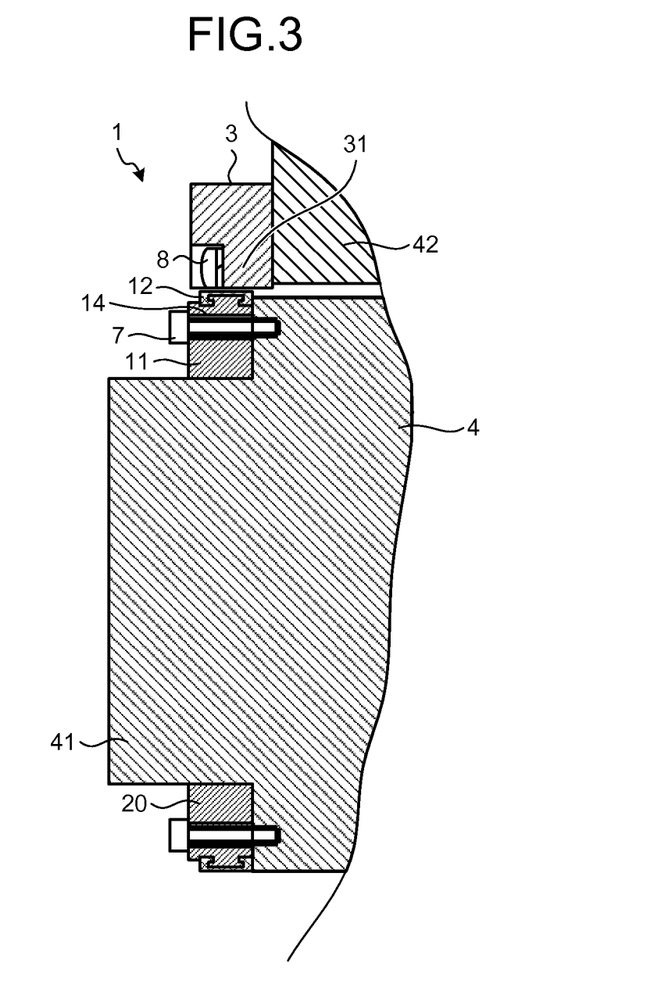
FIG. 3 is a diagram illustrating a usage state of a magnetic encoder according to the first embodiment.

FIG. 3 is a diagram illustrating a usage state of the magnetic encoder according to the first embodiment. The magnetic encoder 1 is installed and used in a machine 4 to be detected. The magnetic drum 20 is coaxial with a rotation axis 41 on the side of the machine 4 to be detected, and is attached to the machine 4 to be detected so as to rotate together with the rotation axis 41. The magnetic drum 20 is fixed to the rotation axis 41 by screwing a drum fixing screw 7 into the attachment hole 14. The sensor head 3 is fixed to a sensor-head mounting seat 42 of the machine 4 to be detected by using a sensor-head fixing screw 8 so that a gap between the outer periphery of the magnetic drum 20 and the sensor head becomes a predetermined gap.

Figure 4:
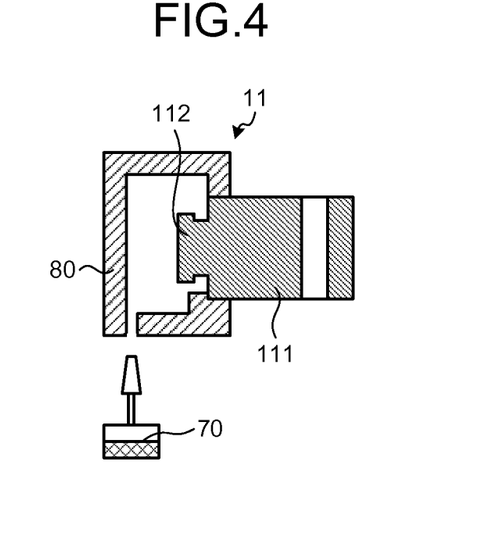
FIG. 4 is a diagram illustrating a state of injection molding of a base material and a magnet.

The magnet 12 is integrally molded with the base material 11 by injection molding. FIG. 4 is a diagram illustrating a state of injection molding of a base material and a magnet. After the base material 11 is arranged so that the engagement convex portion 112 is positioned in a metal mold 80, a mixture 70 of magnetic powder and resin is filled in the metal mold 80 and solidified, thereby the magnet 12 having the same shape as the metal mold 80 can be integrally molded with the base material 11. Accordingly, at the time of manufacturing the magnetic drum 20, an application work of an adhesive is not required, and insufficient filling of the adhesive, occurrence of bubble entrainment in the adhesive, and uneven thickness of the adhesive can be prevented. Accordingly, a manufacturing yield of the magnetic drum 20 can be improved.

Finish machining of the magnet 12 integrally molded with the base material 11 by injection molding is performed, using the exposed centering track 111a without being covered with the magnet 12 as a reference of circular runout tolerance. For example, in a stage of integral molding of the base material 11 and the magnet 12, a machining margin is left on the centering track 111a and the outer periphery of the magnet 12, and the centering track 111a and the outer periphery of the magnet 12 are machined simultaneously. At the time of attaching the magnetic drum 20 to the machine 4 to be detected, the attachment is performed so that the surface of the centering track 111a falls within a predetermined runout range with respect to a center of rotation of the rotation axis 41. Finish machining is performed by using a part of the integrally molded base material 11 (the centering track 111a) as a reference and centering to the rotation axis 41 is performed by using the centering track 111a as a reference, thereby fluctuation of a gap between the MR element 31 and the magnet 12 that occurs due to runout of the outer periphery of the magnet 12 at the time of rotation of the magnetic drum 20 can be suppressed to a low level. Accordingly, at the time of detecting a change of the magnetic field associated with the rotation of the magnetic drum 20 by the MR element 31, disturbance of waveform due to runout of the magnetic drum 20 can be suppressed.

Because there is the magnet 12 also in a part inside the cylindrical portion 112a (a part surrounded by the cylindrical portion 112a, the constricted portion 112b, and the outer circumference of the body portion 111), a force opposing a centrifugal force generated at the time of rotation of the magnetic drum 20 is generated according to the intensity (tensile stress) of the magnet 12 itself. That is, the cylindrical portion 112a being a cylinder portion supports the magnet 12 against the centrifugal force generated at the time of rotation of the magnetic drum 20. Accordingly, an adhesive is not required for fixation between the base material 11 and the magnet 12.

Figure 5:
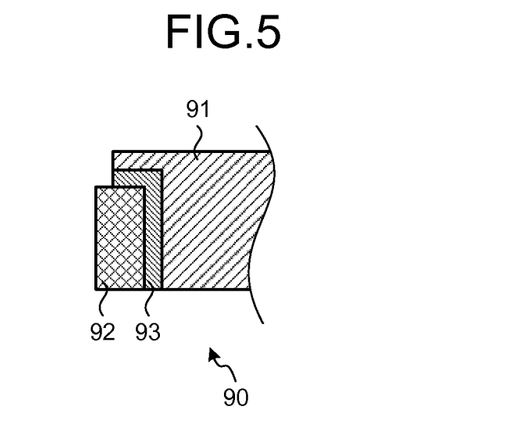
FIG. 5 is a diagram illustrating a structure of a magnetic drum in which a magnet and a base material are bonded and fixed to each other.

A magnetic drum in which a magnet and a base material are bonded and fixed to each other is described below for comparison. FIG. 5 is a diagram illustrating a structure of a magnetic drum in which a magnet and a base material are bonded and fixed to each other. A ring-shaped magnet 92 is fixed by an adhesive 93 to the outer periphery of a ring-shaped base material 91. That is, the adhesive 93 fixes the magnet 92 to the base material 91 by an adhesive force stronger than a centrifugal force or an inertia force generated on the magnet 92 at the time of rotation of a magnetic drum 90.

Figure 6:
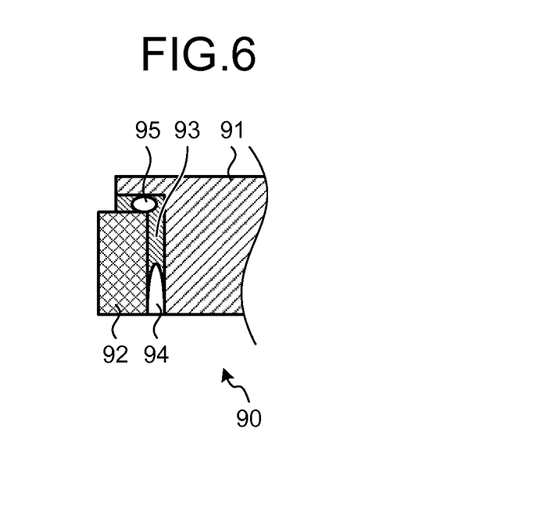
FIG. 6 is a diagram illustrating a magnetic drum in a state where insufficient filling of an adhesive or entrainment of bubbles has occurred.

FIG. 6 is a diagram illustrating a magnetic drum in a state where insufficient filling of an adhesive or entrainment of bubbles has occurred. If a void 94 is generated due to insufficient filling of the adhesive 93 or entrainment of bubbles 95 occurs, these parts are in a state where the base material 91 and the magnet 92 are not fixed. Therefore, the magnet 92 may fall off partially due to the centrifugal force generated in the magnet 92 at the time of rotation of the magnetic drum 90.

Figure 7:
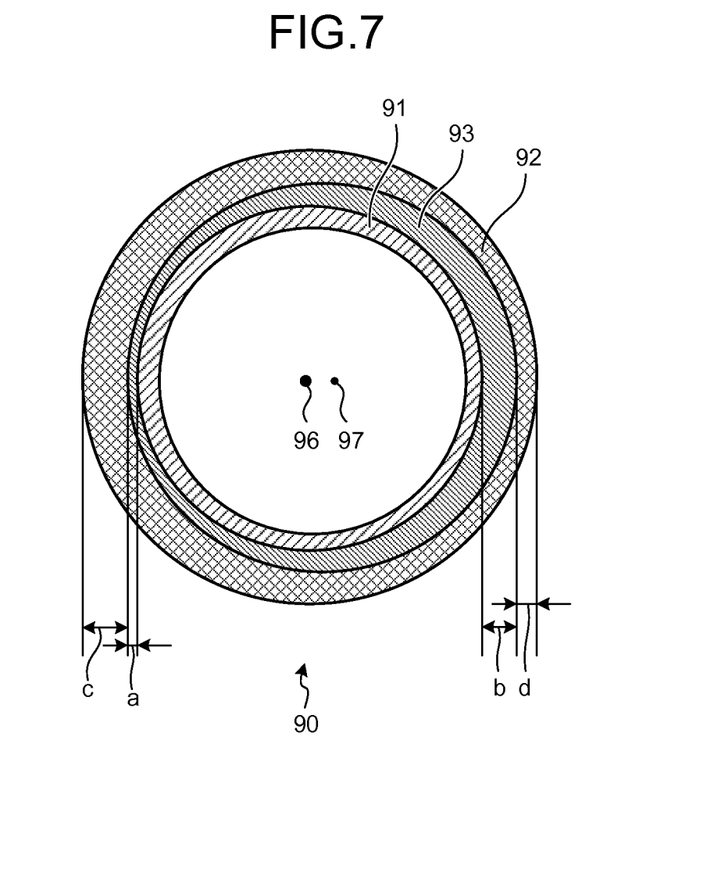
FIG. 7 is a diagram illustrating a magnetic drum in a case where the thickness of an adhesive is uneven.

FIG. 7 is a diagram illustrating a magnetic drum in a case where the thickness of an adhesive is uneven. When the magnet 92 and the base material 91 are bonded and fixed to each other, if the thickness of the adhesive 93 is uneven, even if the void 94 is not generated due to insufficient filling of the adhesive 93 or entrainment of bubbles 95 does not occur, centers of the base material 91 and the magnet 92 deviate from each other. Because finish machining is performed on the outer diameter of the magnet 92 by using a center 96 of the base material 91 as a reference, the center of the outer diameter of the magnet 92 after performing finish machining matches the center 96 of the base material 91. However, a center 97 of the inner diameter of the magnet 92 after performing finish machining does not match the center 96 of the base material 91. That is, if the centers of the base material 91 and the magnet 92 deviate from each other, the thickness of the magnet 92 after performing finish machining becomes uneven, thereby causing vibration. In FIG. 7, the adhesive 93 becomes thinner on the left side on the drawing than on the right side on the drawing (a<b). Because finish machining of the magnet 92 is performed by using the center 96 of the base material 91 as a reference, the center of the outer diameter of the magnet 92 matches the center 96 of the base material 91. However, the center 97 of the inner diameter of the magnet 92 does not match the center 96 of the base material 91. Therefore, the magnet 92 after performing finish machining is thicker on the left side on the drawing than on the right side on the drawing (c>d). Even if the sum of thickness of the adhesive 93 and the magnet 92 is the same (a+c=b+d), there is a difference in density between the adhesive 93 and the magnet 92, and generally, the density of the magnet 92 is considerably larger than that of the adhesive 93. Accordingly, the barycenter of the magnetic drum 90 deviates from the center 96 of the base material 91, thereby causing noise or vibration at the time of rotation of the magnetic drum 90.

Figure 8:
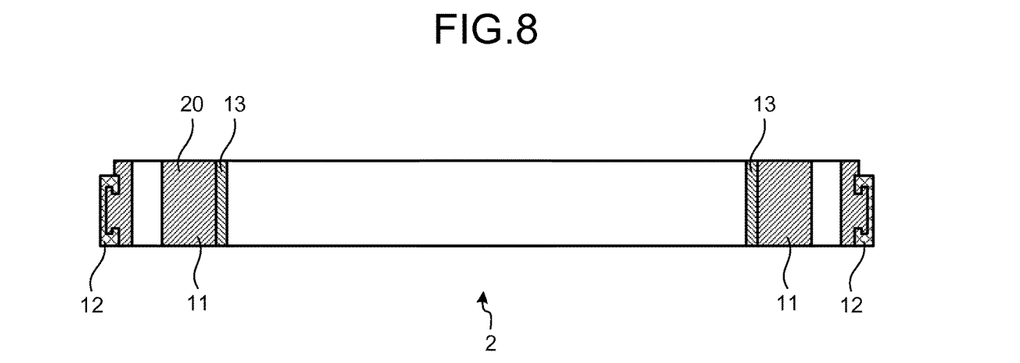
FIG. 8 is a diagram illustrating a structure of a magnetic drum installed with a magnetic shield plate on the inner circumference of a base material.

In the above descriptions, the material of the base material 11 is a ferrous material having magnetic properties. However, if the base material 11 is to be formed of a non-magnetic material (such as aluminum), it suffices to install a magnetic shield plate on the innermost circumference side of the magnetic drum 2. FIG. 8 is a diagram illustrating a structure of a magnetic drum installed with a magnetic shield plate on the innermost circumference side of the magnetic drum, and a magnetic shield plate 13 is installed on the inner circumference of the base material 11. Because the magnetic drum 20 has a hollow structure, if a cable or the like in which a large current flows is arranged inside the magnetic drum 2 at the time of installing the magnetic drum 20 on the rotation axis 41 of the machine 4 to be detected, a magnetic field is generated at the time of distributing power to the cable, which may affect the detection result of the MR element 31. By forming the base material 11 by the magnetic material or by installing the magnetic shield plate 13 on the inner circumference of the magnet 12, an influence of disturbance generated when the cable or the like in which a large current flows is arranged inside the magnetic drum 2 can be suppressed, thereby enabling to increase reliability of angle detection by the MR element 31.

In this manner, in the magnetic encoder according to the first embodiment, the magnet 12 and the base material 11 are fixed in a state with the base material 11 being fitted into the concave portion provided in the magnet 12, thereby enabling to prevent the magnet from being broken at the time of high-speed rotation. By integrally molding the magnet 12 and the base material 11, even if the magnet 12 has a complicated shape, the magnet 12 can be evenly fixed over the whole circumference, thereby enabling to prevent a partial decrease of the bonding strength and bias of barycenter. Because integral molding can be performed by an injection molding machine, manufacturing costs can be reduced by automation.

Second Embodiment

Figure 9:
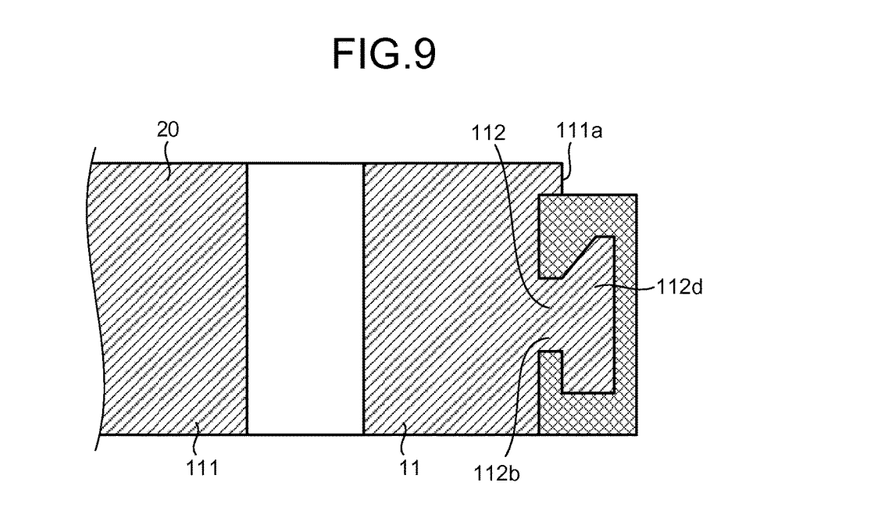
FIG. 9 is a diagram schematically illustrating a configuration of a magnetic encoder according to a second embodiment of the present invention.

FIG. 9 is a diagram schematically illustrating a configuration of a magnetic encoder according to a second embodiment of the present invention. The magnetic encoder according to the second embodiment of the present invention is configured to include a magnetic drum and a sensor head, similarly to the first embodiment. However, the structure of the engagement convex portion 112 is different from that of the first embodiment.

The cylindrical portion 112a in the first embodiment is configured by planes at right angles to each other, extends in the axial direction, and is axially symmetric. However, a cylindrical portion 112d according to the second embodiment is configured by a plurality of planes including surfaces not at right angles to each other, extends in the axial direction, and is axially asymmetric, with a portion of the constricted portion 112b being constricted and thinned. Such a shape as viewed in cross section is referred to "asymmetric shape". In the second embodiment, the inner diameter side of the cylindrical portion 112d is inclined so that machining of the constricted portion 112b on the side of the centering track 111a is facilitated. However, the outer diameter side may be also inclined, or a slope may be provided on a side, which is not the side of the centering track 111a.

Third Embodiment

Figure 10:
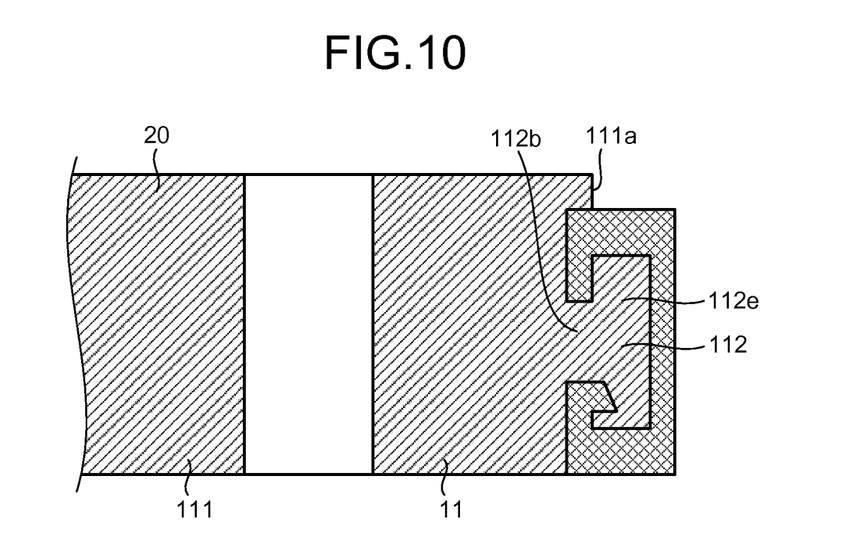
FIG. 10 is a diagram schematically illustrating a configuration of a magnetic encoder according to a third embodiment of the present invention.

FIG. 10 is a diagram schematically illustrating a configuration of a magnetic encoder according to a third embodiment of the present invention. The magnetic encoder according to the third embodiment of the present invention is configured to include a magnetic drum and a sensor head, similarly to the first embodiment. However, the structure of the engagement convex portion 112 is different from that of the first embodiment.

The cylindrical portion 112a according to the first embodiment is configured by planes at right angles to each other, extends in the axial direction, and is axially symmetric. However, a cylindrical portion 112e according to the third embodiment is configured by a plurality of planes including surfaces not at right angles to each other, and is axially asymmetric. Further, one end side (a lower side in FIG. 10) of the cylindrical portion 112e in an axial direction extends axially, an end portion is then bent to extend in a radial direction (toward the center of the magnetic drum), and a portion of the constricted portion 112b is constricted and thinned. Such a shape as viewed in cross section is referred to as "hook shape". By forming the cylindrical portion 112e in the hook shape, the base material 11 hooks the magnet 12, thereby enabling to increase fixation power of the magnet 12 with respect to a centrifugal force. In the third embodiment, the cylindrical portion 112e on the side of the centering track 111a is not in the hook shape because machining is difficult and is in the same shape as the T-shape. However, if machining is possible, the cylindrical portion 112e in both axial directions may be formed in the hook shape.

Figure 11:
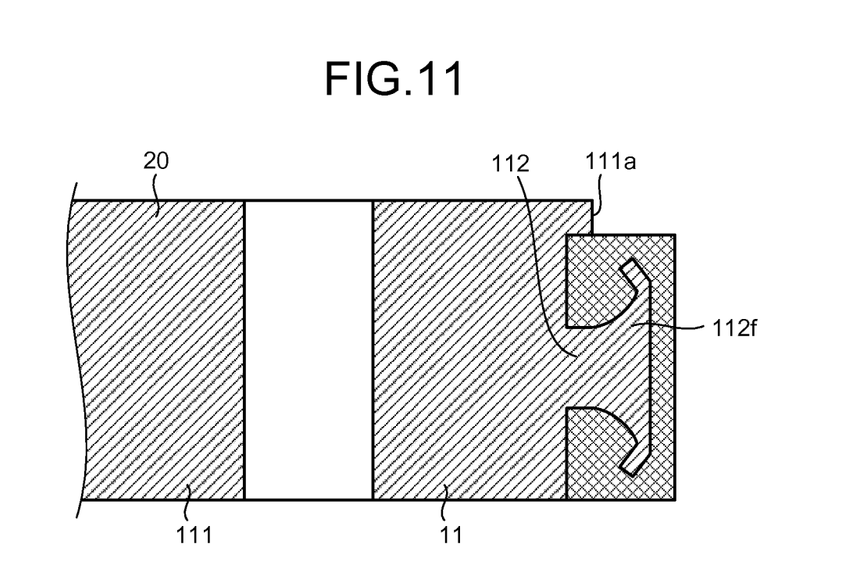
FIG. 11 is a diagram schematically illustrating a configuration of a magnetic encoder in which a cylindrical portion is formed of a plane and a curved surface, and extends in an axial direction, and then an end thereof extends in a diagonal direction to form a symmetrical shape with respect to the axial direction.

The elements of the first to third embodiments can be combined, the plane can be replaced by a curved surface, or an angle formed of sides can be changed. For example, the cylinder portion may be formed of a plane and a curved surface, and has a shape in which the cylinder portion extends in an axial direction, and then an end thereof extends in a diagonal direction to form a symmetrical shape with respect to the axial direction. FIG. 11 is a diagram schematically illustrating a configuration of a magnetic encoder in which a cylindrical portion 112f is formed of a plane and a curved surface, and extends in an axial direction, and then an end thereof extends in a diagonal direction to form a symmetrical shape with respect to the axial direction.

Fourth embodiment.

Figure 12:
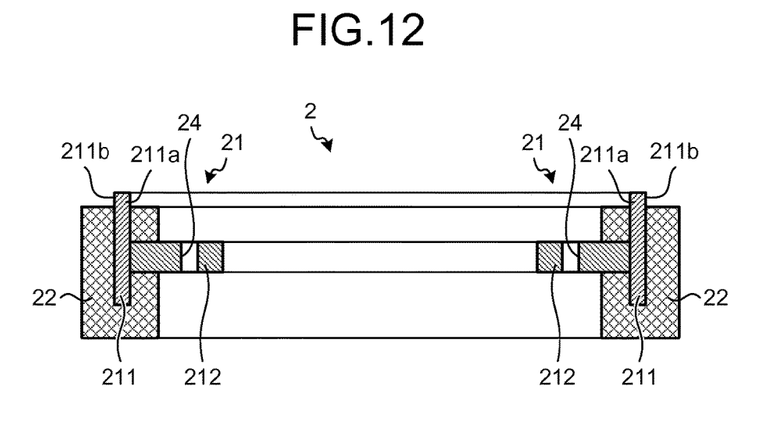
FIG. 12 is a sectional view illustrating a structure of a magnetic drum of a magnetic encoder according to a fourth embodiment of the present invention.

A magnetic encoder according to a fourth embodiment of the present invention is configured to include a magnetic drum and a sensor head, similarly to the first embodiment. However, the structure of the magnetic drum is different from that of the first embodiment. FIG. 12 is a sectional view illustrating a structure of the magnetic drum of the magnetic encoder according to the fourth embodiment of the present invention. The magnetic drum 2 includes a base material 21 and a magnet 22. The base material 21 includes a cylinder member 211 forming a cylinder portion and a flange member 212 forming a flange portion. The cylinder member 211 and the flange member 212 are combined so as to form a T-shape as viewed in cross section. The cylinder member 211 and the flange member 212 are fixed by press fit or spot welding. The flange member 212 is formed with attachment holes 24 for attachment to a shaft of a machine to be detected. The magnet 22 substantially surrounds the cylinder member 211. However, the vicinity of an upper end 211a of the cylinder member 211 projects outside the magnet 22, and the outer periphery of a portion projecting from the magnet 22 is formed as a centering track 211b as a reference plane, being a reference of circular runout tolerance on the outer periphery of the magnet 22. The centering track 211b is provided in a ring shape over the whole circumference of the cylinder member 211.

Figure 13:
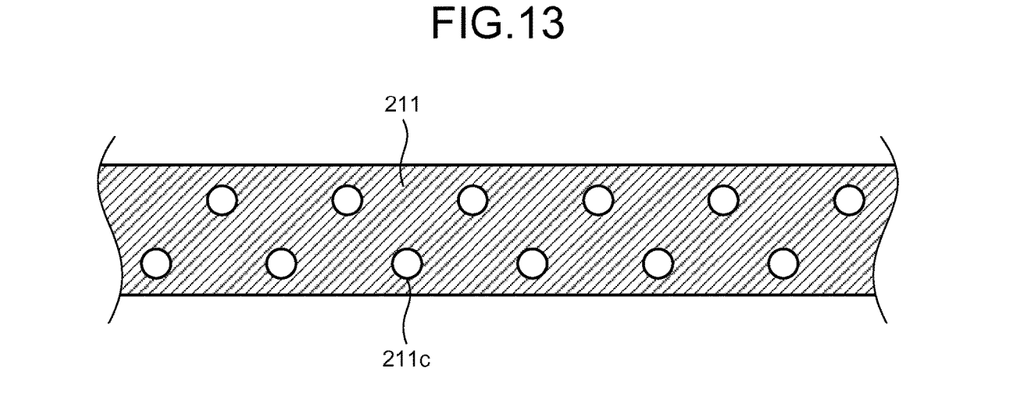
FIG. 13 is a diagram illustrating a shape of the outer periphery of a cylinder member.
Figure 14:
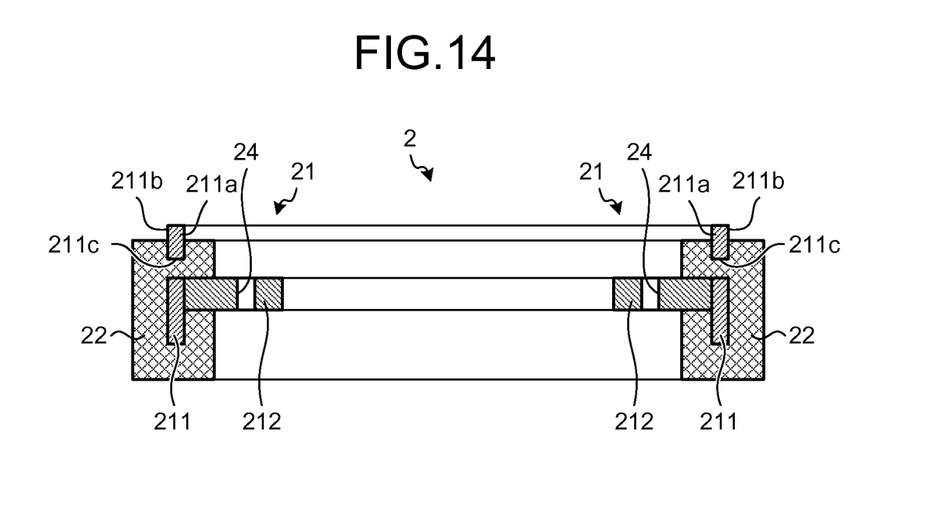
FIG. 14 is a sectional view of the magnetic drum in a retaining hole portion.

FIG. 13 is a diagram illustrating a shape of the outer periphery of a cylinder member. Retaining holes 211c are formed on the cylinder member 211 with predetermined intervals. A configuration in which the retaining holes 211c are formed on the entire surface of the cylinder member 211 is described here as an example; however, the retaining holes 211c may be provided only on a portion on the side of the upper end 211a with respect to the flange member 212. FIG. 14 is a sectional view of the magnetic drum in a retaining hole portion. The magnet 22 on the upper side, being the side of the upper end 211a, than the flange member 212 and a portion being the inside of the cylinder member 211 is connected with the magnet 22 on a portion being the outside of the cylinder member 211 via the retaining hole 211c. That is, the magnet 22 is also filled into the retaining holes 211c so as to wrap around to the inside of the cylinder member 211. The magnetic drum 2 has a shape in which the base material 21 is fitted into the concave portion of the magnet 22 as viewed in cross section of the portion of the retaining hole 211c.

The cylinder member 211 and the flange member 212 are formed by pressing or cutting a ferrous material having magnetic properties. Generally, manufacturing costs can be suppressed by performing cutting when the diameter of the magnetic drum 2 is small, and performing pressing when the diameter of the magnetic drum 2 is large. Knurling is applied to the outer periphery of the cylinder member 211. When the cylinder member 211 and the flange member 212 are formed by pressing, a sectional area of the base material 21 can be decreased as compared to the case where the cylinder member 211 and the flange member 212 are formed by cutting, thereby weight saving of the magnetic drum 2 becomes possible.

Because the magnet 22 is also present in the portion being the inside of the cylinder member 211, a force opposing a centrifugal force generated at the time of rotation of the magnetic drum 2 is generated by the strength (tensile stress) of the magnet 22 itself. That is, the cylinder member 211 being a cylinder portion supports the magnet 22 against the centrifugal force generated at the time of rotation of the magnetic drum 2. Accordingly, an adhesive is not required for fixation between the base material 21 and the magnet 22. Further, because knurling is applied to the outer periphery of the cylinder member 211, it can be prevented that the magnet 22 deviates in a rotation direction with respect to the cylinder member 211 due to an inertia force generated at the time of acceleration and deceleration.

In the above descriptions, the material of the base material 21 is a ferrous material having magnetic properties. However, when the base material 21 is formed of a non-magnetic material (such as aluminum), it suffices to install a magnetic shield plate on the inner circumference side of the magnet 22, similarly to the first embodiment.

Similarly to the first embodiment, the magnet 22 according to the fourth embodiment is integrally molded with the base material 21 by injection molding. Accordingly, at the time of manufacturing the magnetic drum 20, the application work of an adhesive is not required, and thus generation of a void due to insufficient filling of the adhesive, occurrence of bubble entrainment, and uneven thickness can be prevented. Consequently, according to the fourth embodiment breakage of the magnetic drum at the time of high-speed rotation is prevented and vibration can be suppressed similarly to the magnetic drum 2 according to the first embodiment.

Fifth Embodiment

Figure 15:
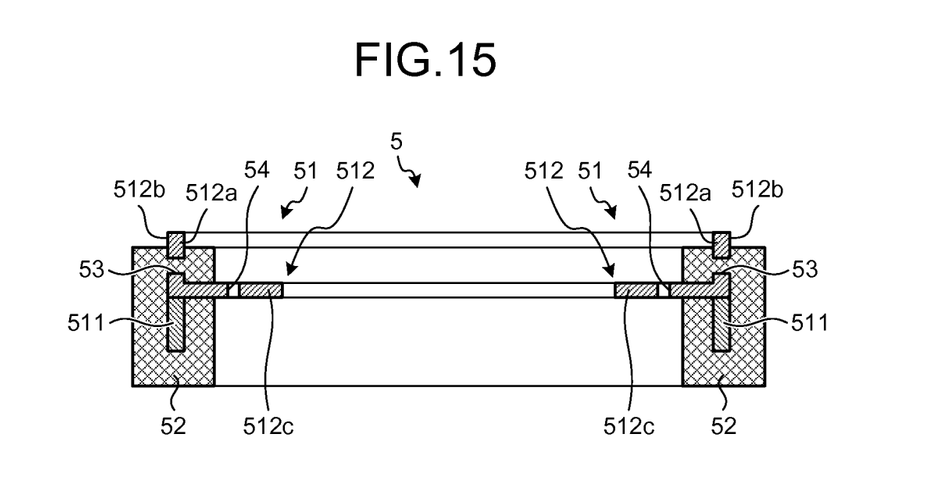
FIG. 15 is a diagram illustrating a structure of a magnetic drum of a magnetic encoder according to a fifth embodiment of the present invention.
Figure 16:
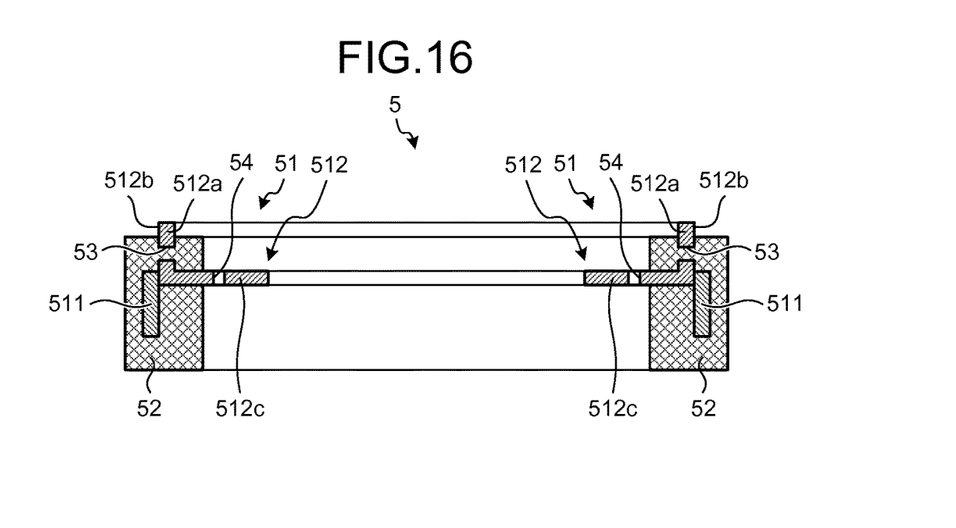
FIG. 16 is a diagram illustrating a configuration of a magnetic drum of having a base material in which a cylinder member and a flange cylinder member are fixed to each other by press fit.

A magnetic encoder according to a fifth embodiment of the present invention is configured to include a magnetic drum and a sensor head, similarly to the first embodiment. However, the structure of the magnetic drum of the fifth embodiment is different from that of the first embodiment. FIG. 15 is a diagram illustrating a structure of the magnetic drum of the magnetic encoder according to the fifth embodiment of the present invention. A magnetic drum 5 includes a base material 51 and a magnet 52. The base material 51 includes a cylinder member 511 and a flange cylinder member 512. The cylinder member 511 and the flange cylinder member 512 are combined so as to form a T-shape as viewed in cross section. The cylinder member 511 and the flange cylinder member 512 are fixed by press fit or spot welding. When the cylinder member 511 and the flange cylinder member 512 are fixed by press fit, the diameter of the cylinder member 511 is formed slightly larger than the diameter of the flange cylinder member 512, so as to insert the flange cylinder member 512 into the cylinder member 511. FIG. 16 is a diagram illustrating a configuration of a magnetic drum having a base material in which a cylinder member and a flange cylinder member are fixed to each other by press fit.

The flange cylinder member 512 includes a cylindrical part 512a and a flanged part 512c, and the cylindrical part 512a and the flanged part 512c are bent so as to form an L-shape as viewed in cross section. The flanged part 512c is provided with attachment holes 54 for attachment to a shaft of a machine to be detected. Therefore, in the fifth embodiment, the cylinder member 511 and the cylindrical part 512a form a cylinder portion, and the flanged part 512c forms a flange portion.

The magnet 52 is installed so as to substantially surround the cylindrical part 512a of the flange cylinder member 512 and the cylinder member 511. However, the vicinity of an upper end of the cylindrical part 512a projects outside the magnet 52, and the outer periphery of a portion projecting from the magnet 52 is formed as a centering track 512b. The centering track 512b is provided in a ring shape over the whole circumference of the cylindrical part 512a. Retaining holes 53 are formed with a predetermined interval, similarly to the fourth embodiment, in the cylindrical part 512a of the flange cylinder member 512 and the cylinder member 511. In FIG. 15 and FIG. 16, the magnet 52 on a portion on the upper side, being the upper end of the cylindrical part 512a side, than the flanged part 512c and on the inside of the cylindrical part 512a is connected to the magnet 52 on a portion on the outside of the cylindrical part 512a via the retaining hole 53. That is, the magnet 52 is also filled into the retaining holes 53 so as to wrap around to the inside of the cylindrical part 512a. The magnetic drum 5 has a shape in which the base material 51 is fitted into the concave portion of the magnet 52 as viewed in cross section of a portion of the retaining hole 53.

The cylinder member 511 and the flange cylinder member 512 are formed by pressing a ferrous plate material. When the cylinder member 511 and the flange cylinder member 512 are to be formed of a non-magnetic material (such as aluminum), a magnetic shield plate is installed on the inner circumference side of the magnet 52, similarly to the first to fourth embodiments.

Similarly to the first embodiment, the magnet 52 is integrally molded with the base material 51 by injection molding. Accordingly, at the time of manufacturing the magnetic drum 5, the application work of an adhesive is not required, and thus generation of a void due to insufficient filling of the adhesive, occurrence of bubble entrainment in the adhesive, and uneven thickness of the adhesive can be prevented. Consequently, breakage of the magnetic drum at the time of high-speed rotation can be prevented and vibration can be suppressed, similarly to the magnetic drum 2 according to the first embodiment.

Sixth Embodiment

Figure 17:
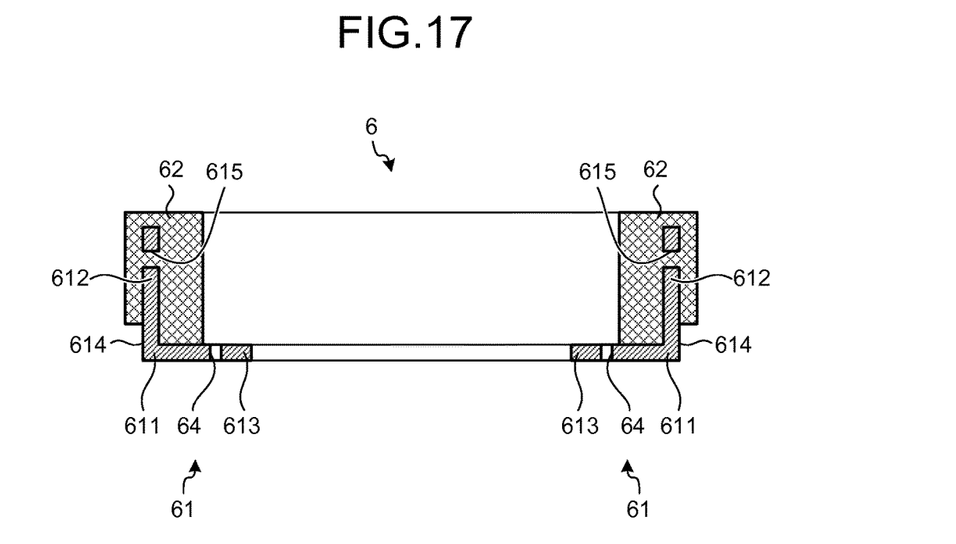
FIG. 17 is a diagram illustrating a structure of a magnetic drum of a magnetic encoder according to a sixth embodiment of the present invention.

A magnetic encoder according to a sixth embodiment of the present invention is configured to include a magnetic drum and a sensor head, similarly to the first embodiment. However, the structure of the magnetic drum of the sixth embodiment is different from that of the first embodiment. FIG. 17 is a diagram illustrating a structure of the magnetic drum of the magnetic encoder according to the sixth embodiment of the present invention. A magnetic drum 6 includes a base material 61 and a magnet 62. The base material 61 is formed in an L-shape in cross section to include a cylinder portion 612 and a flange portion 613 with a bent portion 611 therebetween. The flange portion 613 is provided with attachment holes 64 for attachment to a shaft of a machine to be detected.

The magnet 62 is installed so as to substantially surround the cylinder portion 612 of the base material 61. That is, the magnetic drum 6 has a shape in which the base material 61 is fitted into a concave portion of the magnet 62 as viewed in cross section. However, the vicinity of the bent portion 611 of the base material 61 projects outside the magnet 62, and the outer periphery of a portion projecting from the magnet 62 is formed as a centering track 614. The centering track 614 is provided in a ring shape over the whole circumference of the base material 61. Retaining holes 615 are formed with predetermined intervals in the cylinder portion 612 of the base material 61. In FIG. 17, the magnet 62 on a portion on the inside of the cylinder portion 612 of the base material 61 is connected to the magnet 62 on a portion on the outside of the cylinder portion 612 via the retaining hole 615. That is, the magnet 62 is also filled into the retaining holes 615 so as to wrap around to the inside of the cylinder portion 612.

The base material 61 is formed by pressing a ferrous plate material. When the base material 61 is to be made of a non-magnetic material (such as aluminum), a magnetic shield plat is installed on the inner circumference side of the magnet 62, similarly to the first to fifth embodiments.

Similarly to the first embodiment, the magnet 62 of the sixth embodiment is integrally molded with the base material 61 by injection molding. Accordingly, at the time of manufacturing the magnetic drum 6, the application work of an adhesive is not required, and thus occurrence of a void due to insufficient filling of the adhesive, occurrence of bubble entrainment in the adhesive, and uneven thickness of the adhesive can be prevented. Consequently, breakage of the magnetic drum at the time of high-speed rotation can be prevented and vibration can be suppressed, similarly to the magnetic drum 2 according to the first embodiment.

According to the sixth embodiment, because the base material 61 is configured by one component, manufacturing costs of the magnetic drum 6 can be kept lower than those of the first to fifth embodiments by a reduction of the number of components. On the other hand, the centrifugal force acting on the magnet 62 acts so as to enlarge a bending angle of the base material 61, and thus the accuracy may decrease if the magnetic drum 6 is rotated at a high speed. Therefore, it suffices to use the magnetic encoder depending on the application such that the magnetic encoder according to the first to fifth embodiments is used when the magnetic drum is attached to a shaft that rotates at a high speed and used, and the magnetic encoder according to the sixth embodiment is used when the magnetic drum is attached to a shaft that rotates at a low speed and used.

In the above descriptions, a case where a base material having an L-shape in cross section is configured by one component has been described as an example; however, a cylinder portion and a flange portion can be configured by separate members and fixed by welding or the like. For example, even if the cylinder portion 612 and the flange portion 613 are configured as separate members, when manufacturing costs can be suppressed more than those of the magnetic encoder according to the fourth and fifth embodiments, the base material having an L-shape in cross section maybe configured by two components.

INDUSTRIAL APPLICABILITY

As described above, the magnetic encoder according to the present invention is useful in that manufacturing costs of a magnetic drum is low and that the magnetic encoder has high reliability. Specifically, the magnetic encoder is suitable for detecting an angle of a shaft at the time of high-speed rotation.

REFERENCE SIGNS LIST 1 magnetic encoder, 2, 5, 6, 20, 90 magnetic drum, 3 sensor head, 4 machine to be detected, 7 drum fixing screw, 8 sensor-head fixing screw, 11, 21, 51, 61, base material, 12, 22, 52, 62, 92 magnet, 13 magnetic shield plate, 14, 24, 54, 64 attachment hole, 32 cable, 33 signal processing unit, 41 rotation axis, 42 sensor-head mounting seat, 70 mixture of magnetic powder and resin, 80 metal mold, 93 adhesive, 94 void, 95 bubble, center of base material, 97 center of inner diameter of magnet, 111 body portion, 111a, 211b, 512b, 614 centering track, 112 engagement convex portion, 112a, 112d, 112e, 112f cylindrical portion, 112b constricted portion, 112c groove, 211, 511 cylinder member, 211a upper end, 53, 211c, 615 retaining hole, 212 flange member, 512 flange cylinder member, 611 bent portion, 612 cylinder portion, 613 flange portion.

The invention claimed is:

1. A magnetic encoder comprising:
a magnetic drum having an annular magnet formed with a magnetic pole array on an outer circumference thereof and a base material that supports the magnet, and mounted on a rotation axis of a machine to be detected to rotate together with the rotation axis; and
an MR element that is installed in the machine to be detected in a state of facing an outer periphery of the magnetic drum with a gap, to detect a change of a magnetic field caused by rotation of the magnetic drum, wherein
the magnetic encoder detects an angle of the rotation axis based on a detection result of the MR element,
the base material has a ring-shaped flange portion into which the rotation axis is inserted when the magnetic drum is mounted on the rotation axis, and an engagement convex portion provided so as to project over a whole circumference of an outer periphery of the flange portion towards an outer side in a radial direction of the flange portion,
the flange portion has a reference plane provided in a part of the outer periphery of the flange portion over a whole circumference as a reference of circular runout tolerance on an outer periphery of the magnet,
the engagement convex portion has a constricted portion projecting from the outer periphery of the flange portion, and a cylindrical portion extending in an axial direction of the flange portion from a tip end of the constricted portion,
the magnet surrounds the engagement convex portion so as to wrap around to a gap between the cylindrical portion and the flange portion, and exposes the reference plane without covering the reference plane, and
the magnet projects in the radial direction from the reference plane on the outer periphery of the flange portion.

2. The magnetic encoder according to claim 1, wherein
the cylindrical portion extends in both axial directions of the flange portion from the tip end of the constricted portion, and
in the engagement convex portion, the constricted portion and the cylindrical portion form a T-shape as viewed in cross section.

3. The magnetic encoder according to claim 1, wherein
the cylindrical portion extends from the tip end of the constricted portion in the axial direction of the flange portion, and
a part of the cylindrical portion is formed as a slope.

4. The magnetic encoder according to claim 1, wherein
the cylindrical portion extends from the tip end of the constricted portion in the axial direction of the flange portion, an end thereof is bent to extend in a radial direction, and the constricted portion forms a hook shape as viewed in cross section.

5. The magnetic encoder according to claim 1, wherein
the magnet projects in the radial direction from an outermost periphery of the flange portion.

6. The magnetic encoder according to claim 1, wherein
the reference plane is exposed relative to the magnet and is disposed axially adjacent to the magnet and radially between the outer periphery of the magnet and an inner periphery of the magnet.

7. A magnetic encoder comprising:
a magnetic drum having an annular magnet formed with a magnetic pole array on an outer circumference thereof and a base material that supports the magnet, and mounted on a rotation axis of a machine to be detected to rotate together with the rotation axis; and
an MR element that is installed in the machine to be detected in a state of facing an outer periphery of the magnetic drum with a gap, to detect a change of a magnetic field caused by rotation of the magnetic drum, wherein
the magnetic encoder detects an angle of the rotation axis based on a detection result of the MR element, the base material has a ring-shaped flange portion into which the rotation axis is inserted when the magnetic drum is mounted on the rotation axis, and a cylinder portion extending from an outer periphery of the flange portion in an axial direction of the magnetic drum over a whole circumference of the flange portion, the magnet surrounds the cylinder portion by wrapping around from outside of the cylinder portion to inside of the cylinder portion, so that one end of the cylinder portion projects, the one end of the cylinder portion projecting in an axial direction from the magnet is designated as a reference plane, which is a reference of circular runout tolerance on an outer periphery of the magnet, and the magnet projects in a radial direction from the reference plane on an outer periphery of the cylinder portion.

8. The magnetic encoder according to claim 7, wherein the cylinder portion is formed with a plurality of retaining holes on a side of the one end of the cylinder portion with respect to the flange portion, and the magnet is also filled into the retaining holes.

9. The magnetic encoder according to claim 7, wherein the cylinder portion and the flange portion are fixed to represent a T-shape in cross section.

10. The magnetic encoder according to claim 7, wherein the cylinder portion and the flange portion are fixed to represent an L-shape in cross section.

11. The magnetic encoder according to claim 9, wherein the cylinder portion and the flange portion are configured as separate members.

12. The magnetic encoder according to claim 10, wherein the cylinder portion and the flange portion are configured as separate members.

13. The magnetic encoder according to claim 7, wherein the magnet projects in the radial direction from an outermost periphery of the flange portion.

14. The magnetic encoder according to claim 7, wherein the reference plane is exposed relative to the magnet and is disposed axially adjacent to the magnet and radially between the outer periphery of the magnet and an inner periphery of the magnet.

* * * * *